(12) United States Patent
Truan et al.

(10) Patent No.: US 7,249,429 B2
(45) Date of Patent: Jul. 31, 2007

(54) QUICK-RELEASE BUCKET ADAPTER

(75) Inventors: Charles J Truan, Royal Oak, MI (US); James Truan, Royal Oak, MI (US); Paul Mandrick, Harrison Township, MI (US)

(73) Assignee: Trynex, Inc., Warren, MI (US)

( * ) Notice: Subject to any disclaimer, the term of this patent is extended or adjusted under 35 U.S.C. 154(b) by 150 days.

(21) Appl. No.: 11/008,053

(22) Filed: Dec. 9, 2004

(65) Prior Publication Data

US 2005/0111955 A1 May 26, 2005

Related U.S. Application Data

(63) Continuation of application No. 10/066,925, filed on Feb. 4, 2002, now Pat. No. 6,848,142.

(60) Provisional application No. 60/266,366, filed on Feb. 2, 2001.

(51) Int. Cl.
*E02F 3/96* (2006.01)

(52) U.S. Cl. ............................. 37/403; 37/468; 37/406; 15/78

(58) Field of Classification Search .................. 37/903, 37/403, 468, 404, 405, 406, 407; 15/78, 15/98, 49.1
See application file for complete search history.

(56) References Cited

U.S. PATENT DOCUMENTS

| | | | | |
|---|---|---|---|---|
| 3,999,315 A | * | 12/1976 | Nye | 37/459 |
| 4,550,512 A | | 11/1985 | Felstet | |
| 4,845,867 A | * | 7/1989 | Albrecht | 37/406 |
| 5,129,169 A | * | 7/1992 | Aubichon | 37/231 |
| 5,240,085 A | * | 8/1993 | Klossner et al. | 180/53.1 |
| 5,253,449 A | | 10/1993 | Webb et al. | |
| 5,273,375 A | | 12/1993 | Plourde | |
| 5,369,832 A | | 12/1994 | Hagger | |
| 5,485,691 A | * | 1/1996 | Stevens et al. | 37/302 |
| 5,621,940 A | | 4/1997 | Lewis et al. | |
| 5,685,689 A | | 11/1997 | Schneider et al. | |
| 5,775,013 A | | 7/1998 | Von Schalscha | |
| 5,918,389 A | | 7/1999 | Hall | |
| 6,016,584 A | | 1/2000 | Melroe | |
| 6,088,865 A | | 7/2000 | Truan et al. | |
| 6,088,938 A | | 7/2000 | Logan | |
| 6,098,321 A | * | 8/2000 | Logan | 37/409 |
| 6,113,308 A | * | 9/2000 | Johnson, II | 404/74 |

(Continued)

*Primary Examiner*—Thomas A Beach
(74) *Attorney, Agent, or Firm*—Dickinson Wright PLLC; William H. Honaker

(57) ABSTRACT

A manipulator assembly for attachment to a bucket of a construction vehicle is disclosed. The manipulator assembly includes a universal attachment apparatus for attaching a utility tool to the bucket. The universal attachment apparatus includes a housing adapted to support the utility tool, at least one mounting bracket connected to the housing, and at least one mounting arm having a first end and a second end, the first end being connected to the mounting bracket. The mounting arms further include feet positioned adjacent the quick-release connector for allowing the utility tool to pivot relative to the bucket. A quick-release connector is mounted to the second end of the mounting arm for selectively securing the housing to the bucket. A biasing device is disposed on the quick-release connector for continuously urging the quick-release connector into engagement with the bucket. Therefore, the bucket remains free of the quick-release connector and the biasing device when the utility tool is removed from the bucket.

9 Claims, 3 Drawing Sheets

U.S. PATENT DOCUMENTS

| | | |
|---|---|---|
| 6,193,261 B1 | 2/2001 | Hahka |
| 6,240,660 B1 * | 6/2001 | Dugas .................. 37/280 |
| 6,243,975 B1 | 6/2001 | Gall |
| 6,457,268 B1 | 10/2002 | Perry et al. |
| 6,701,630 B2 * | 3/2004 | Humphrey .................. 37/403 |
| 6,848,142 B2 * | 2/2005 | Truan et al. .................. 15/78 |

* cited by examiner

QUICK-RELEASE BUCKET ADAPTER

CROSS-REFERENCE TO RELATED APPLICATIONS

This application is a continuation application of U.S. application Ser. No. 10/066,925 filed Feb. 4, 2002 now U.S. Pat. No. 6,848,142, which claims priority to provisional patent application Ser. No. 60/266,366 filed on Feb. 2, 2001.

BACKGROUND OF THE INVENTION

1. Field of the Invention

The subject invention relates to manipulator assemblies for attachment to a bucket of a construction vehicle, specifically for attachment of utility tools to a front loader.

2. Description of the Related Art

Utility vehicles which incorporate a front loading bucket are prevalent in industry for scooping quantities of material and moving the material from one place to another. These front loading systems can be removably mounted to vehicles such as a farm tractor, or they may be integrally mounted on a vehicle dedicated to the front loading task. The general construction of a front loader also lends itself to performing multiple tasks other than scooping quantities of material. However, in order to perform these other tasks the user is often required to remove the bucket to mount an alternate apparatus or attachment to the front loader for use. Removing the bucket and attaching a new apparatus to the front loader is often time consuming and thus an inefficient use of time and equipment.

One such system is disclosed in U.S. Pat. No. 5,685,689 to Schneider et al. The '689 Patent discloses a quick attachment system for attaching a bucket to a vehicle. The vehicle has a pair of lift arms positioned adjacent the bucket. The user exits the vehicle and positions an alignment member into a locking bracket on the bucket. Once the alignment member is positioned, the user operates a lever that forces the pins into the lift arms. The bucket is now attached to the vehicle for use. However, the '689 Patent does not disclose, teach, or suggest attaching utility tools to the bucket, while the bucket remains attached to the vehicle.

While some attachments may require direct mounting to the front loader after the bucket is removed, there are lighter duty attachments for which this requirement is not a necessity. For these lighter duty accessories, attachment to the bucket precludes the necessity for bucket removal, mounting of the apparatus, and then reversing the process after the use of the attachment has been completed.

U.S. Pat. No. 4,550,512 to Felstet and U.S. Pat. No. 6,088,938 to Logan illustrate attachment mechanisms for attaching a tool to a bucket. The '512 Patent discloses an implement being connected to a bucket having sockets for receiving the implement. The implement is secured to the bucket by inserting bolts through the bucket and into the implement. The '938 Patent discloses a hinged attachment for connecting the tool to a bucket. The attachment is connected to a plate with hinges that engage the bucket. The attachment pivots about the hinges and then pins are used to secure the base of the attachment to the bucket. Another assembly, shown in U.S. Pat. No. 5,369,832 to Hagger, discloses a bucket mounted sweeper. The sweeper has rods that engage hinges on the bucket. The sweeper is utilized to sweep material into the bucket. The sweeper does not have any other attachment means, therefore the sweeper is able to pivot as the bucket is raised and lowered.

Accordingly, the related art systems are characterized by one or more inadequacies. There is a need for a utility tool and universal attachment, which can be quickly attached to a bucket for use in industrial, construction, farm operations, etc. Additionally, the related art systems require the buckets to have specially designed components to engage the attachments and prevent the attachment from being attached to differently sized buckets. Furthermore, these components are actually directly attached to the bucket, thereby requiring additional time and effort to remove the components in order to use the bucket. Also the use of the bucket is hindered by the components. The related art systems also require skilled operators to have efficient operation of the utility tools.

SUMMARY OF THE INVENTION AND ADVANTAGES

A manipulator assembly for attachment to a bucket of a construction vehicle is disclosed. The manipulator assembly includes a housing, a utility tool supported by the housing, and at least one mounting bracket connected to the housing. The assembly also includes at least one mounting arm having a first end and a second end, the first end being connected to the mounting bracket. A quick-release connector is mounted to the second end of the mounting arm for selectively securing the housing to the bucket, and a biasing device is disposed on the quick-release connector for continuously urging the quick-release connector into engagement with the bucket, wherein the bucket remains free of the quick-release connector and the biasing device when the utility tool is removed from the bucket.

The subject invention overcomes the inadequacies of the related art patents. The subject invention provides a manipulator assembly and a universal attachment apparatus for allowing a utility tool to be quickly and efficiently mounted to a bucket of a construction vehicle. Also, the subject invention allows the manipulator assembly to fit on any sized bucket without fixing any unnecessary components into the bucket for securing the utility tool. In other words, the ability to mount the broom to the bucket does not hinder the use of the bucket in the ordinary course. Also, the assembly has the ability to float, or pivot, relative to the quick-release connector. The ability to float allows non-skilled operators of a vehicle to utilize the assembly efficiently. No matter how far down the operator manipulates the bucket, the assembly can still float, which enhances the sweeping ability of the mechanism. Floating also improves the sweeping as the assembly moves over uneven terrain.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
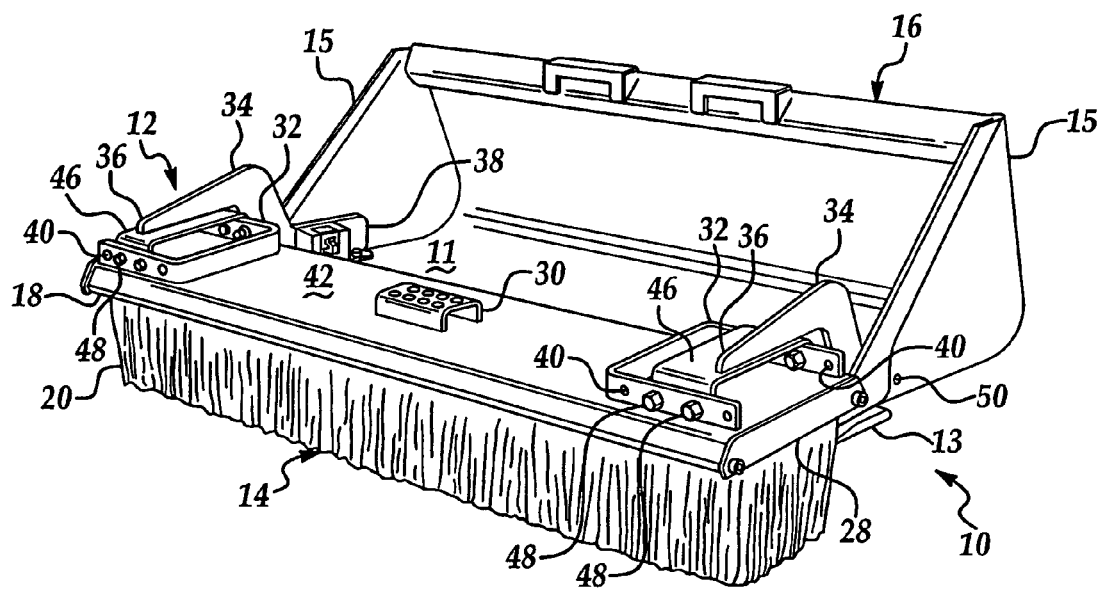
FIG. 1 is a front prospective view of a utility tool mounted to a front loader bucket.

Referring to the Figures, wherein like numerals indicate like or corresponding parts throughout the several views, a manipulator assembly for attachment to a bucket 16 of a construction vehicle (not shown) is generally shown at 10 in FIG. 1. The manipulator assembly 10 includes a universal attachment apparatus 12 for attaching a utility tool 14 to the bucket 16. The bucket 16 has a floor 11, a front edge 13, and vertical side walls 15. Construction vehicles include front loaders, such as bobcats, tractors, or other construction vehicles having buckets. For purposes of description herein, the terms "upper," "lower," "right," "left," "rear," "front," "vertical,""horizontal," and derivatives thereof shall relate to the invention as oriented in FIG. 1. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
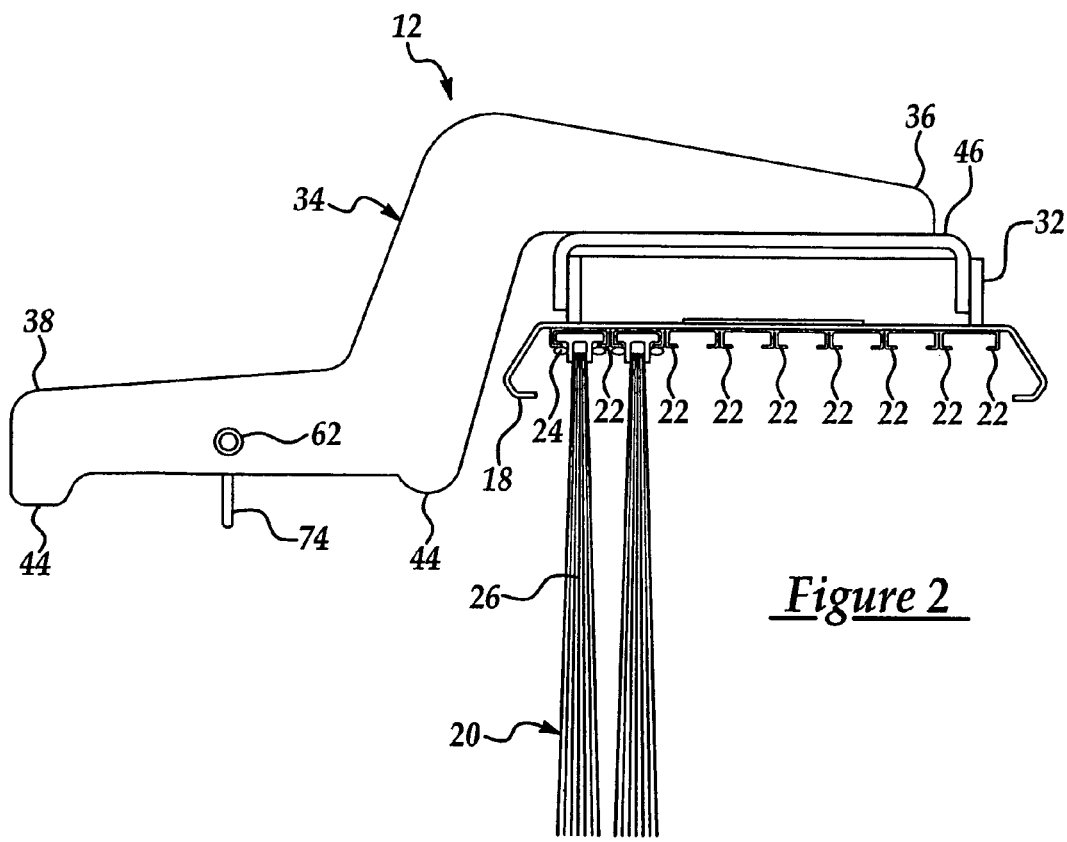
FIG. 2 is an elevation view of the right side of the utility tool.

The universal attachment apparatus 12 includes a housing 18 adapted to support the utility tool 14. The housing 18 may be made of any material, but is preferably formed of a metal or a plastic material. The utility tool 14, as depicted in the Figures, is illustrated as a broom. However, it is to be understood that the utility tool 14 may be any tool for use with construction vehicles, such as scrapers, squeegees, etc. In one embodiment, the housing 18 further includes channels for receiving a brush section 20. Referring to FIG. 2, the housing 18 is generally of an inverted C-shaped piece of formed metal and has mounted to a lower horizontal surface a series of adjacent inverted C-channels 22 extending the length of the housing 18 in a parallel adjacent manner. The brush sections 20 further include a T-section 24 securing a plurality of bristles 26, such that the T-section 24 engages the C-shaped channel 22. Brush sections 20 are inserted from one end of the housing 18 into each channel in a telescoping manner. It is to be understood that the brush sections 20 may be inserted differently than described without deviating from the subject invention. While FIG. 2 only illustrates two brush sections 20, it will be understood by those skilled in the art that each C-channel receives therein a brush section to comprise a full brush compliment. When all brush sections 20 are installed in a desired configuration, an end plate 28 (see FIG. 1) is bolted to each end to retain brush sections 20 in place in housing 18. The manipulator assembly 10 further includes a step 30 extending from the housing 18. The step 30 can be incorporated to a central upper surface 42 of housing 18 to provide an operator a convenient place to step while mounting the vehicle to which the bucket 16 is attached.

The subject invention further includes at least one mounting bracket 32 connected to the housing 18 and at least one mounting arm 34 having a first end 36 and a second end 38, the first end 36 being connected to the mounting bracket 32. The mounting bracket 32 further includes attachment points 40 for allowing the mounting arm 34 to attach to the housing 18 such that the mounting arm 34 accommodates buckets of different dimensions. Typical buckets are available in varying widths based upon the particular construction vehicle and use. Referring now to FIGS. 1 and 2, the mounting brackets 32 are illustrated as U-shaped right-hand and left-hand mounting brackets and, respectively, are attached to an upper surface 42 of housing 18 such that the parallel legs of the U-section are generally aligned with the longitudinal axis of housing 18.

The mounting arms 34 further include a mounting channel 46 for engaging the mounting brackets 32 on the housing 18. The mounting arms 34 are further defined as Z-shaped mounting arms 34. It is to be understood that the mounting arms 34 may be shaped differently to accomplish the subject invention. Referring to the Figures, the mounting arms 34 are illustrated as right-hand and left-hand mounting arms and, respectively, are generally Z-shaped segments having a forward extending first end 36 and a rearward extending second end 38. Each mounting arm 34 has attached a mounting channel 46 permanently affixed to the first end 36, such as by welding. A right-hand mounting channel is attached to right-hand mounting arm and a left-hand mounting channel is attached to left-hand mounting arm. Each mounting channel 46 is of a generally inverted U-shaped configuration wherein the vertically depending legs have two holes with a substantially identical spacing as the attachment points 40 in the mounting brackets 32.

The mounting channels 46 are then attached to mounting brackets 32 by aligning the holes therein with the desired set of holes in the mounting brackets 32 and affixing thereto with bolts 48. The set of holes utilized to attach the mounting channels 46 to the mounting brackets 32 is determined by the interior width of the bucket 16, such that mounting arms 34 are substantially adjacent the interior vertical walls 15 of bucket 16. Each vertical wall 15 of bucket 16 has a wall hole 50 proximate to the lower portion of bucket 16 and proximate to the front edge 13 of bucket 16.

The shape of the mounting arms 34 provides two important benefits. First, when the utility tool 14 is attached to a vehicle that has a front entrance, the bucket 16 must be low enough to allow the vehicle door to open. By providing Z-shaped segments, the bucket 16 can be lowered sufficiently to allow the door to open. Second, the Z-shaped segments allow the forces acting upon the broom to be along the same general plane as the housing 18. In this way, the bristles 26 do not collapse. As seen in FIGS. 1 and 2, the bottom of the bucket 16 and the bottom of the arms 34 are lower than the bottom of housing 18. While the mounting arms 34 are preferably Z-shaped, other configurations may carry out the subject invention, such as S-shaped.

A spreader bar 52 extends between the mounting arms 34 for adding additional lateral support to the utility tool 14. The spreader bar 52 is extendable for allowing the mounting arms 34 to engage different attachment points 40 of the mounting brackets 32 to accommodate buckets of different dimensions. The spreader bar 52 can be adjusted to correspond with the various lateral spacings of the mounting channels 46. In one embodiment, the spreader bar 52 includes nested angle irons or telescoping tubes which can be bolted at hole spacings substantially equal to the spacings of the attachment points 40 on the mounting brackets 32.

Figure 3:
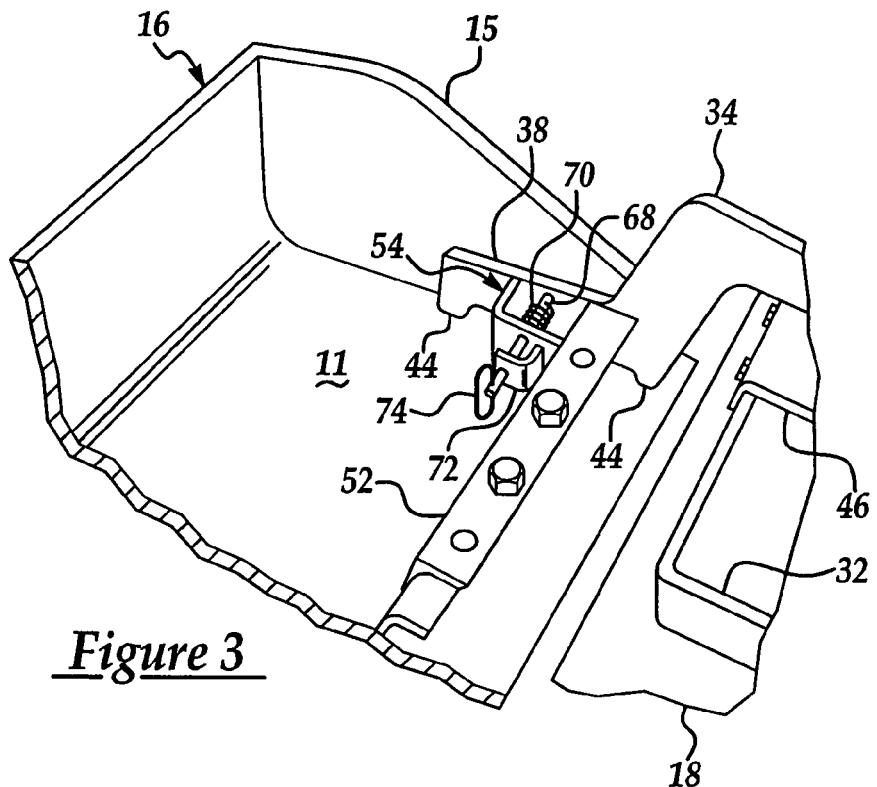
FIG. 3 is an interior prospective view of the left side of the utility tool shown mounted to the interior of the bucket.
Figure 4:
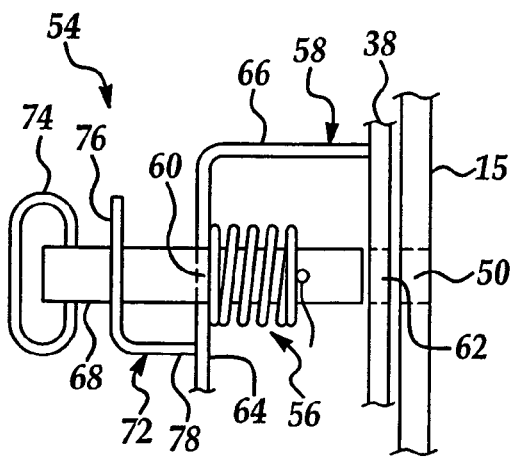
FIG. 4 is a top plan view of the quick-release connector in an unlocked position.
Figure 5:
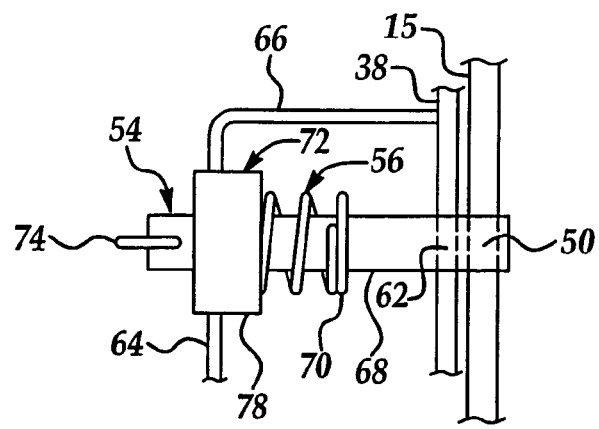
FIG. 5 is a top plan view of the quick-release connector in a locked position locking the utility tool to the bucket.

Referring to FIGS. 3-5, a quick-release connector 54 is mounted to the second end 38 of the mounting arm 34 for selectively securing the housing 18 to the bucket 16. A biasing device 56 is disposed on the quick-release connector 54 for continuously urging the quick-release connector 54 into engagement with the bucket 16. Therefore, the bucket 16 remains free of the quick-release connector 54 and the biasing device 56 when the utility tool 14 is removed from the bucket 16.

The quick-release connector 54 further includes a support 58 extending from the mounting arm 34 having a support hole 60 therein and the mounting arm 34 having an arm hole 62, such that the arm hole 62 and the support hole 60 are adjacent one another. The support 58 is mounted to the interior surface of each second end 38 such that it has one leg 64 substantially parallel to second end 38 and another leg 66 laterally disposed therefrom. In the preferred embodiment, the arm hole 62 and the support hole 60 are co-linear. The quick-release connector 54 further includes a pin 68 supported by the support 58, such that the pin 68 is extendable through the support hole 60 and the arm hole 62 for engaging the bucket 16. The bucket 16 has wall holes 50 positioned on the sidewalls 15, such that pin 68 extends into the wall holes 50 for securing the utility tool 14 to the bucket 16. The biasing device 56 further includes a spring 70 engaging the pin 68 and either one of the support 58 and the mounting arm 34 for biasing the pin 68 through the arm hole 62. Preferably, the spring 70 engages the support 58 for urging the pin 68 through the arm hole 62.

The quick-release connector 54 further includes a stop 72 engaging the pin 68, the stop 72 being rotatable between a locked position and an unlocked position. The pin 68 further includes a handle 74 for rotating the stop 72 between the locked position and the unlocked position. The unlocked position is illustrated in FIG. 4 and the locked position is illustrated in FIG. 5. The stop 72 is further defined as having a flat portion 76 and a leg portion 78, such that in the locked position the flat portion 76 engages the support 58 and in the unlocked position the leg portion 78 engages the support 58.

The mounting arms 34 further include feet 44 positioned adjacent the quick-release connector 54 for allowing the utility tool 14 to pivot, or float, relative to the bucket 16. In use, the pivoting of the utility tool 14 facilitates the sweeping action because it allows the utility tool 14 to move with respect to the contour of the ground, while keeping the bristles 26 generally parallel to the ground.

In operation, mounting arms 34 are spaced to substantially match the interior opening between respective sidewalls 15 of the bucket 16 by attaching the mounting channels 46 at the appropriately spaced attachment points 40 of the mounting brackets 32. The spreader bar 52 is likewise adjusted in a like manner. The quick-release connector 54, when in the unlocked position, the pin 68 does not extend through the arm holes 62 in second ends 38. To maintain the quick-release connector 54 in the unlocked position, the operator grasps the handle 74 and pulls the pin 68 inwardly against the biasing force of the spring 70 until the stop 72 can be rotated. As the stop 72 is rotated, the leg portion 78 is beyond the support 58 and rotating the pin 68 engages the leg portion 78 against the support 58, thus maintaining the quick release connector 54 in the unlocked position.

Next, the bucket 16 is positioned to receive therein the second ends 38 of the respective mounting arms 34. The bucket 16 is raised until the bucket floor 11 contacts the feet 44 of the second ends 38. Once the housing 18 is in its desired position with respect to the bucket 16, and aligned with the holes in bucket 16 sidewalls 15, each quick-release connector 54 is then rotated about its longitudinal axis to the unlocked position, thus permitting the spring 70 to extend and maintain the pin 68 in its engaged position wherein the pin 68 extends through the holes 50, 62. Thus, the housing 18 can be readily and quickly mounted and be removed from the bucket 16 in a matter of minutes for efficient utilization of equipment and manpower. Those skilled in the art will readily recognize that the attachment apparatus 12 can be readily adapted to alternate utility attachments other than the broom assembly illustrated herein.

Another method, which the subject invention is designed to accommodate, allows the attachment apparatus 12 to be connected to the bucket 16 without requiring the user to exit the vehicle. The vehicle having the bucket 16 is positioned such that the bucket 16 is underneath the mounting arms 34. As the bucket 16 is positioned, the force of the side walls 15 force the pin 68 within the support 58 against the bias of the spring 70. The bucket 16 is then manipulated up and down until the arm holes 62, support holes 60, and holes 50 in the bucket 16 wall are aligned. The location of the quick-release connector 54 with respect to the holes 50, 62 allows the second end 38 of the mounting arms 34 to rock within the bucket 16. The rocking allows the quick-release connector 54 to become aligned. Once aligned, the spring 70 forces the pin 68 to extend through all the holes, thereby snapping the utility tool 14 to the bucket 16.

Figure 6:
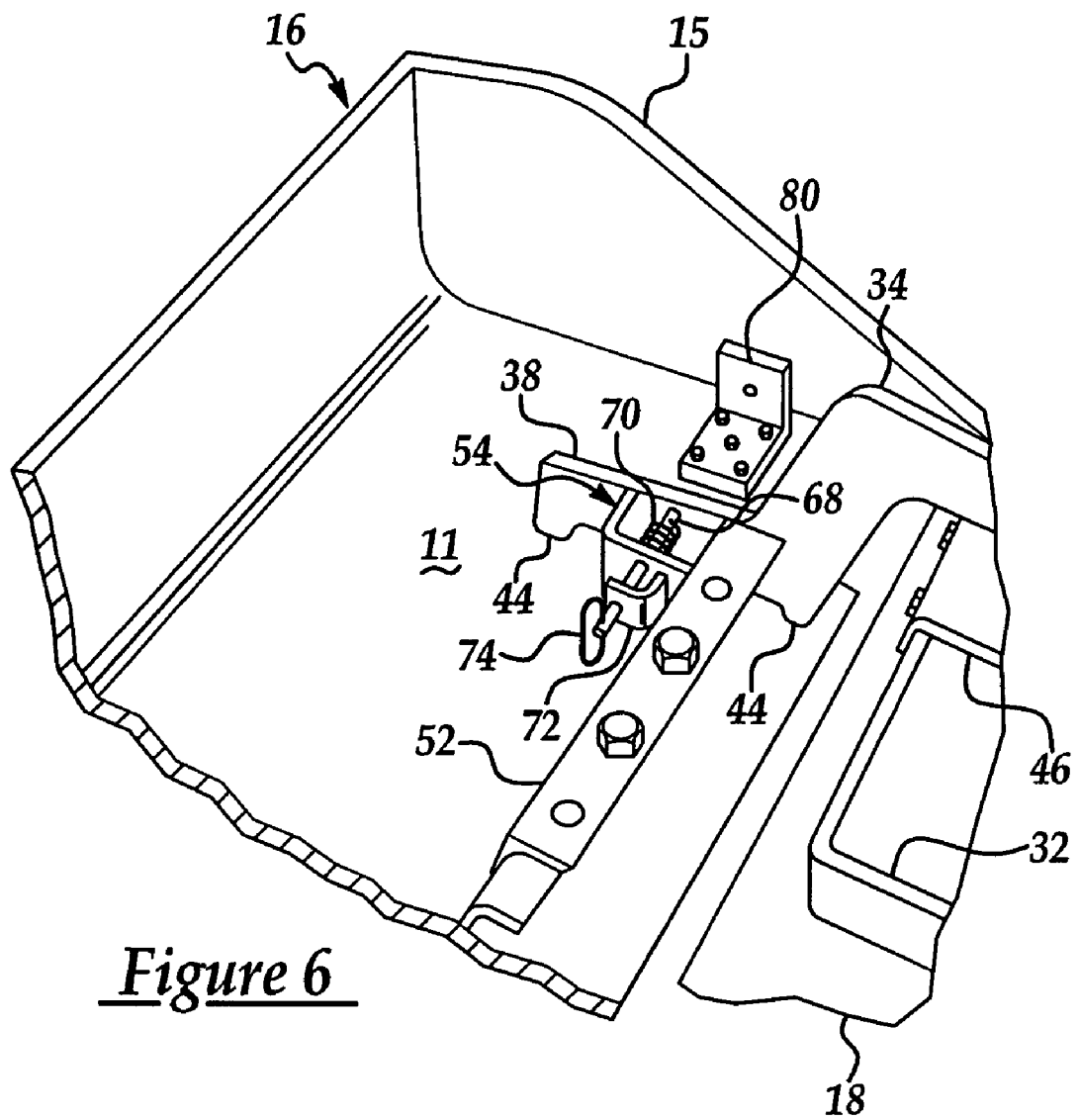
FIG. 6 is an interior prospective view of another embodiment of the leftside of the utility tool shown mounted to a universal bracket.

Referring to FIG. 6, the subject invention further includes another embodiment having a universal bracket 80 for connecting to the bottom 11 of the bucket 16. The universal bracket 80 is preferably an L-shaped bracket having an upper leg having a hole for engaging the biasing device 56. However, the L-shaped bracket may be formed of two separate pieces and then welded together or made from one continuous piece. The universal bracket 80 allows the universal attachment apparatus 12 to be used with buckets that are wider than the apparatus 12 can accommodate. The universal bracket 80 may be connected to the bottom 11 by bolts or by other means as is known in the art. The universal bracket 80 allows the apparatus 12 to be used with buckets 16 that do not have holes 50 in the sidewall 15. In other words, there is a space between the universal bracket 80 and the sidewall 15.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A utility tool for attachment to a construction vehicle with a bucket having a floor and side walls, said utility tool comprising:

a housing having an substantially planar upper surface;

a first mounting bracket and a second mounting bracket supported by said upper surface and longitudinally spaced from one another;

a first mounting arm and a second mounting arm each having a first end for engaging said first and said second mounting brackets respectively and a second end for securing to the side walls of the bucket;

said second ends further define an arm hole for aligning with a wall hole defined in the side walls of the bucket;

a biasing device coupled to each of said second ends and a pin engaging each of said biasing devices for urging said pin collinearly through said arm hole into engagement with the wall hole such that the bucket remains free of said biasing device when said utility tool is removed from the bucket;

a support supporting said biasing device and said pin and having a support hole collinear with said arm hole;

said biasing device has as a spring engaging said pin and said support for biasing said pin collinearly through said arm hole for engagement of the wall hole in the bucket;

said support further comprises a vertical support leg extending inwardly from said second end and a parallel support leg extending substantially parallel to said second end;

said parallel support leg defines said support hole and supports said biasing device and said pin;

a stop coupled to said pin and rotatable between a locked position and an unlocked position, wherein said pin extends through the arm hole in said unlocked position for securing said utility tool to the bucket;

wherein said first end positions said upper surface above said second end for allowing said utility tool to connect to the bucket while the bucket is in a lowered position below said housing.

2. A utility tool as set forth in claim 1 wherein each of said first and said second mounting arms are generally Z-shaped.

3. A utility tool as set forth in claim 1 wherein said second end further includes feet extending beyond said mounting arm for engaging the floor of the bucket and for allowing said housing to pivot once said utility tool is attached to the bucket.

4. A utility tool as set forth in claim 3 further comprising a quick-release connector located between said feet for creating a pivot point and engaging said mounting arms for pivotably coupling said mounting arms to the side wall of the bucket.

5. A utility tool as set forth in claim 1 wherein each of said first and said second mounting brackets further include a plurality of attachment points for allowing said respective mounting arm to attach at various points to said mounting bracket for accommodating buckets of different dimensions.

6. A utility tool as set forth in claim 1 wherein said stop is further defined as comprising a flat portion substantially parallel to said parallel support leg and a leg portion substantially perpendicular to said parallel support leg such that in said locked position said leg portion contacts said parallel support leg.

7. A utility tool as set forth in claim 1 further comprising a handle coupled to said pin for rotating said stop between said locked position and said unlocked position.

8. A utility tool as set forth in claim 1 further comprising a step extending upwardly from said upper surface for facilitating entrance into the construction vehicle while said utility tool is attached to the bucket.

9. A utility tool as set forth in claim 1 further comprising mounting channels coupled to said first ends for engaging said mounting brackets

* * * * *